United States Patent [19]

Klimek et al.

[11] 3,802,649

[45] Apr. 9, 1974

[54] MAGNETIC TAPE RECORDING AND/OR PLAYBACK MACHINES

[75] Inventors: Norbert Max Klimek; Manfred Anton Huber, both of London, England

[73] Assignee: English Numbering Machines Limited, London, England

[22] Filed: Aug. 3, 1972

[21] Appl. No.: 277,613

[30] Foreign Application Priority Data

Sept. 22, 1971 Great Britain .................... 44088/71

[52] U.S. Cl. .................................. 242/209, 274/4 D

[51] Int. Cl. ..... B11b 15/32, G03b 1/04, G11b 5/00

[58] Field of Search ........................... 242/201–210; 274/4 D, 11 D

[56] References Cited

UNITED STATES PATENTS

| | | | |
|---|---|---|---|
| 3,610,553 | 10/1971 | Matsuyama | 242/201 |
| 3,604,714 | 9/1971 | Staar | 242/206 |
| 3,409,239 | 11/1968 | Siebert | 242/210 |

*Primary Examiner*—Leonard D. Christian
*Attorney, Agent, or Firm*—Brisebois & Kruger

[57] ABSTRACT

A tape deck for driving a magnetic type cassette, in which both spool shafts and two capstans are permanently coupled to a single drive motor. The spool shafts are connected to the motor via electrically actuated friction clutches which selectively give one of two frictional forces. This allows the take-up spool to run at the correct speed for any given tape diameter on the spool and the tape supply spool to exert a braking force to maintain tape tension.

7 Claims, 2 Drawing Figures

PATENTED APR 9 1974 3,802,649

SHEET 2 OF 2

MAGNETIC TAPE RECORDING AND/OR PLAYBACK MACHINES

Figure 1:
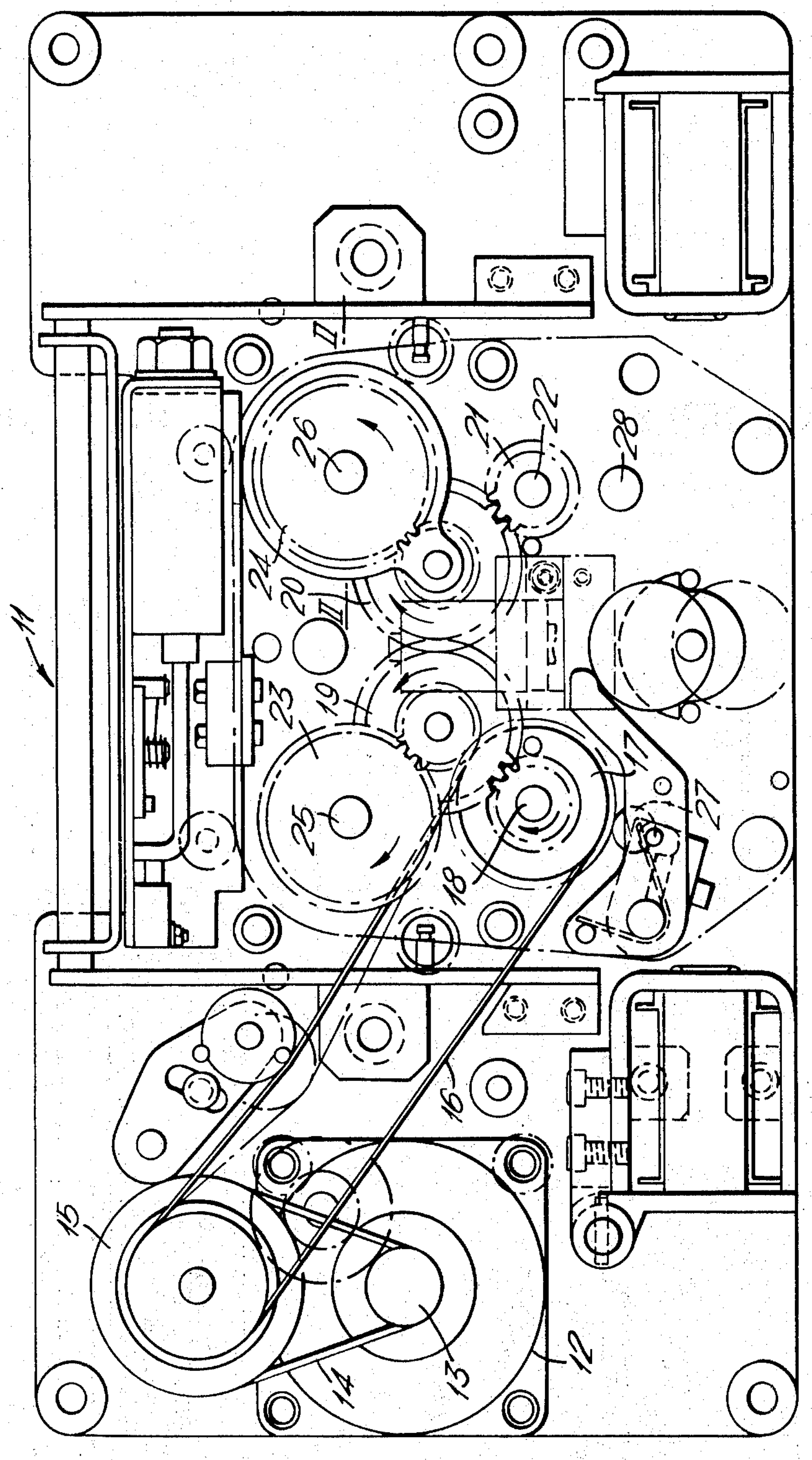

The present invention relates to a tape transport for a magnetic tape recording and/or playback machine, and particularly to a bi-directional tape transport of the type having two capstans, one for driving the tape in each transport direction.

In known bi-directional tape transports of the type utilising two capstans it has been necessary to provide a plurality of drive motors. However, since the two tape spools require to be driven at different speeds depending on how much tape there is actually wound on the spool, and since, in general, the speed will be different from the speed of rotation of the capstans, the circuits required to synchronise all the drive motors have been rather complex. In fact, in some known prior devices of this type it has been known for four motors to be used, one for each capstan and one for each tape spool.

This has led to considerable sophistication and complexity and has the added disadvantage that the relative speed relationship can drift out of the desired phase when the tape transport has been operating for some time due to temporal effects such as wear. In addition, in a system using a number of motors it is not possible to forecast the likely change in each motor due to wear so that after a time such systems are prone to become unbalanced. Moreover, since a number of servo circuits are required to maintain the phase relationship of the motor, a certain amount of mismatch can be encountered leading to a change in the relative speed relationship between the driven shafts so that, despite the complexity, known devices have not been very reliable.

According to the present invention a bi-directional tape transport for a magnetic tape recording and/or playback machine, comprises a motor, two tape spool mounting devices each adapted to receive a tape spool and to transmit rotational motion thereto *via* a slipping clutch, the spool mounting devices being connected to the motor to be driven simultaneously in respective rotational directions, and two capstans, both connected to the motor to be driven simultaneously in respective rotational directions, for selectively transmitting drive to the tape in either direction.

In embodiments of this invention the essential requirement that the speed of the capstans and tape spools are always related to each other by a given phase relationship is readily achieved since the speed of each is dependent on the speed of a single motor. Thus, it is only necessary to control the speed of this single motor. The provision of slipping clutches for the spool mounting devices ensures that the required variation in speed of the spools as the tape is transferred from one to the other can be readily achieved. It will be appreciated that there are no balancing problems in tape transports constructed as embodiments of this invention, as there are in multi-motor drive systems, since it is not necessary to match a number of drive sources.

In a preferred embodiment of the invention the means for adjusting the frictional force exerted by the slipping clutches is operative to reduce the frictional force exerted by the slipping clutch of the spool mounting device on which is mounted the spool from which tape is being drawn, and which is operative to raise the said frictional force to its maximum value substantially simultaneously with the disengagement of the driving capstan from the tape so that this slipping clutch acts as a brake. Similarly, it is preferred that the means for adjusting the frictional force exerted by the slipping clutches is operative to raise the frictional force exerted by both slipping clutches to a maximum when both capstans are disengaged from the tape. In this situation the tape will be normally under a tension when it is stationary. When a capstan is moved to engage the tape and commence transporting it in one direction the force resisting this movement is simultaneously decreased so that the tape retains a slight tension, and both the driving force of the capstan and the force exerted by the spool which is to take up the tape are applied to the tape immediately the capstan is engaged.

It will be appreciated that the drive to the spool mounting devices should be so arranged that the driving side of the slipping clutch is driven at the maximum speed that the spool is likely to require to be driven. This in turn is given by the speed of the capstan an it is preferred that the means for controlling the speed of the motor are adjustable to control the motor to run at two different speeds at least.

Thus, when a tape is being driven in any one direction, the frictional force exerted by the slipping clutch on the take-up spool is at a maximum thereby drawing the tape onto the spool, and the frictional force exerted by the slipping clutch of the supply spool is at a minimum thereby allowing the spool to rotate in the transport direction despite the fact that the driven side of the slipping clutch of the spool mounting device on which the supply spool is mounted is continuously rotating in the opposite direction. Similarly, it is preferred that the means for adjusting the frictional force exerted by the slipping clutches is operative to reduce to a minimum the frictional force exerted by the slipping clutch of the spool mounting device on which the take-up spool is mounted, after the driving capstan has been disengaged from the tape, to assist in the braking operation of the other slipping clutch.

In one embodiment of the invention each capstan has an associated freely rotatable pinch roll which is movable to effect engagement of the tape and the capstan or to effect disengagement of the tape from the capstan. Alternatively, the pinch roll may be fixed and the capstans movable to effect engagement of the tape with the capstan in a known manner.

One of the major advantages of tape transports constructed as embodiments of this invention lies in the fact that the connections between the capstans and the motor, and the spool mounting devices and the motor, are mechanically interlinked to maintain a constant phase relationship between them all. This has the advantage that there is no possibility of any change in the phase relationship between any of the driven shafts. In a preferred embodiment of the invention the connections between the capstans and the spool mounting devices comprise a train of meshing gear wheels.

The motor is preferably adapted to maintain a constant speed despite fluctuations in the load and may be of any known type. Preferably the means for controlling the speed of the motor are adjustable to control the motor to run at two different speeds at least; one particularly convenient type of motor for this application is a d.c. servo motor controlled by means of magnetic controlled resistors. The magnetic controlled resistors are energised by a permanent magnet or magnets which is or are fitted to the rotor. As the rotor starts to turn, and while it is turning, the permanent magnets move past the magnetic controlled resistors and the rate of flux change in the magnetic controlled resistors due to the passing of the magnet determines the voltage at the output of the magnetic controlled resistors and this, in turn, controls the speed of the motor since the rate of flux change is directly related to the speed of the motor. Suitable servo electronics are required for speed compensation without the loss of torque.

Figure 2:
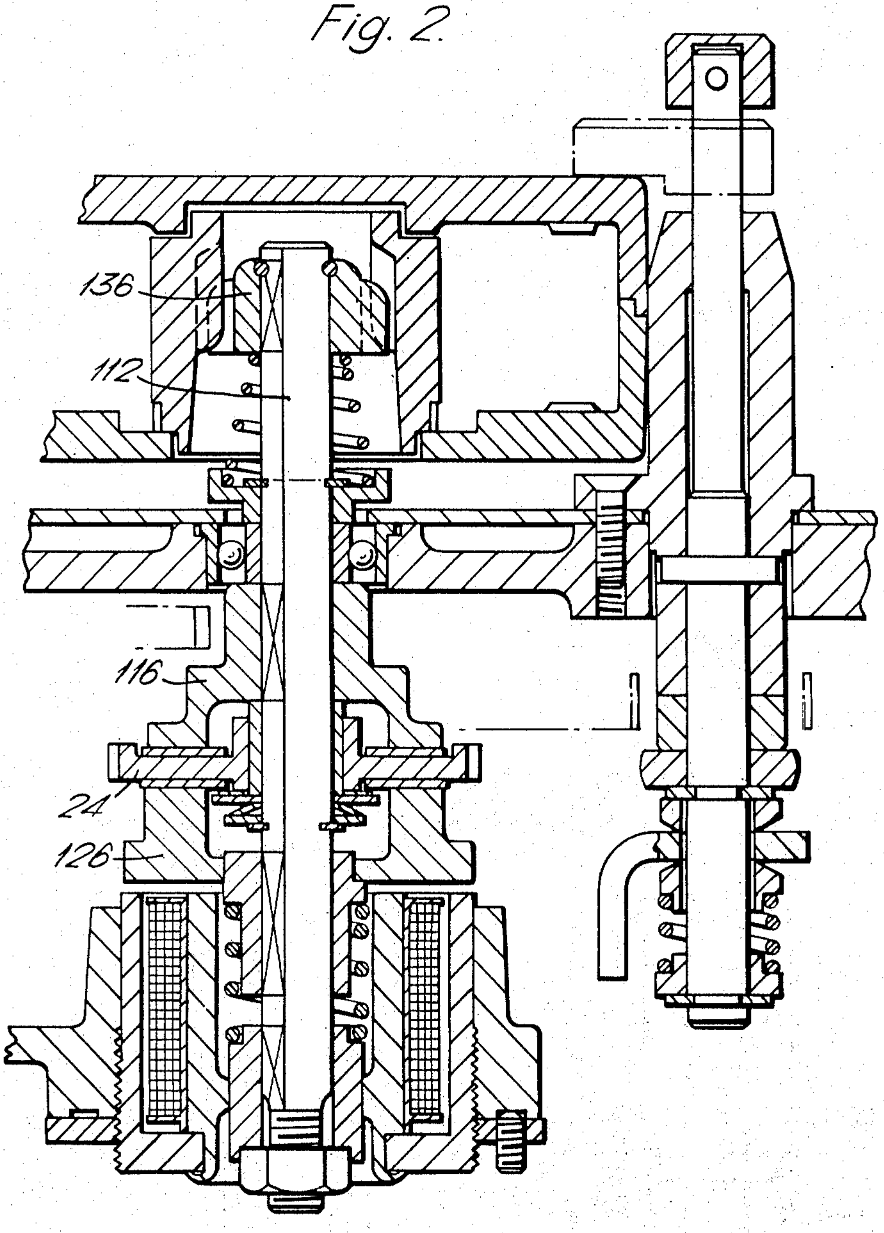

One embodiment of the invention will now be more particularly described, by way of example, with reference to the accompanying drawints, in which:

FIG. 1 is a schematic plan view of a preferred embodiment of this invention; and FIG. 2 is a schematic partial cross section taken on the line II—II of FIG. 1.

Referring now to FIG. 1 of the drawings there is shown schematically, a tape deck generally indicated 11 on which is mounted a motor 12 having an output shaft carrying a pulley 13. The pulley 13 is connected by a belt 14 to one rim of an intermediate double pulley 15 on the other rim of which there is mounted a belt 16 by means of which the pulley 15 transmits drive to a pulley 17. The pulley 17 is coupled for rotation with a capstan 18, and is formed with teeth which mesh with a cooperating gear wheel 19.

The gear wheel 19 forms an intermediate link in a gear train which includes a second intermediate gear wheel 20 which meshes with the gear wheel 19 and also with a further gear wheel 21 which is rigidly mounted for rotation with a second capstan 22.

It will be appreciated that, since there are four gear wheels in the train linking the capstan 18 and the capstan 22, whichever direction of rotation the capstan 18 is driven by the motor 12 the capstan 22 will be driven in the opposite direction. The intermediate gear wheels 19 and 20 are not simple gear wheels but are composite gear wheels having two sets of radially directed teeth one set arranged on a larger diameter than the other. The teeth arranged on the smaller diameters of each of the wheels 19 and 20, mesh with respective further gear wheels 23 and 24 which, in turn, are respectively rigidly mounted for rotation with two spool mounting devices 25 and 26. Again, it will be appreciated that, since there are four gear wheels in the train interconnecting the two spool mounting devices 25 and 26, spools mounted on the spool mounting devices 25 and 26 always rotate in opposite directions with respect to each other.

The spool mounting devices 25 and 26 include slipping clutches between the driven gears 23 and 24 respectively and the output shafts, as shown in FIG. 2 which is a cross-sectional view through the spool mounting device 26. This is more particularly described in our co-pending U.S. application Ser. No. 268,856 filed July 3, 1972. Briefly, it comprises a shaft 112 carrying at one end a shaped boss 136 for locating a spool and transmitting rotational movement from the shaft 112 thereto. The gear wheel 24 is slidably mounted over the shaft 112 and sandwiched between a hub 116 which is rigidly attached to the shaft, and an armature 126 of a solenoid which is spring biased towards the gear wheel 24 and keyed on to the shaft 112 for rotation therewith. Energisation of the solenoid causes a withdrawal of the armature 126 to reduce the frictional force between the wheel 24 and the hub 116. The spool can then rotate at the appropriate speed allowed by the tape tension whereas the input drive to the spool mounting device, that is the gear wheel 24, is rotated at a constant speed dependent solely on the speed of the motor 12.

The tape transport described above operates in the following manner:

The motor 12 is driven at a constant speed despite load fluctuations by any suitable known device, or as described above. The drive from the motor 12 is transmitted by the belts 14 and 16 to the pulley 17 which drives the capstan 18. This drive is transmitted via the gear wheels 19, 20, 21, 23 and 24 to the whole system comprising the two capstans 18 and 22 and the two spool mounting devices 25 and 26. The capstans 18 and 22 rotate in opposite directions and the spool mounting devices 25 and 26 rotate in opposite directions; the capstan 18 rotates in the same direction as the spool mounting device 25 and the capstan 22 rotates in the same direction as the spool mounting device 26.

Each of the capstans 18 and 22 has an associated pinch roll 27 and 28 respectively, and these pinch rolls are mounted so that they can be advanced towards or retracted from the respective capstan. The tape, when in position, passes from a spool on the spool mounting device 25 around the capstan 18, to the capstan 22, and around this to a spool on the spool mounting device 26. The directions of rotation of the spool mounting devices 25 and 26 are such that the tape experiences equal and opposite forces tending to wind it onto the spools mounted on the spool mounting devices 25 and 26 respectively. Although the tape is in engagement with the capstans 18 and 22, there is no movement of the tape because the system as a whole is symmetrically balanced, although the capstans 18 and 22 contribute to the tension in the tape itself.

When it is desired to transport the tape in one direction or the other the appropriate pinch roll, for example the pinch roll 28, is advanced towards its cooperating capstan, say the capstan 22. The force which can now be exerted by the capstan 22 is greater than the force which can be exerted by the capstan 18 and accordingly the tape starts to move towards the spool on the spool mounting device 26 which becomes the take-up spool, the spool mounted on the spool mounting device 25 becoming the supply spool in this situation.

An electric signal is passed to the solenoid of the spool mounting device 25 simultaneously with the signal which operates the capstan pinch roll 28 to reduce the frictional force exerted by the slipping clutch of the spool mounting device 25. Accordingly the tape transport operates to wind the tape from the spool on the spool mounting deivce 25 *via* the capstan 22 to the take up spool on the spool mounting device 26. The speed at which the spool on the spool mounting device 26 rotates will depend on the amount of tape on each spool; if there is very little tape on the take-up spool it will be necessary for it to rotate at or near its maximum speed and accordingly the spool will rotate at substantially the same speed as the input shaft to the spool mounting device 26. Correspondingly, the slipping clutch will operate to transmit drive substantially without slipping.. However, if, on the other hand, the spool on the spool mounting device 26 was nearly full, the spool would be rotated at or near its minimum speed, and accordingly, the maximum amount of slip would occur at the slipping clutch of the spool mounting device 26.

It will be appreciated that when the slipping clutch of spool mounting device 25 is arranged to provide its minimum friction, the drive gear 23 to the spool mounting device continues to rotate in the original direction, that is, clockwise as shown in the drawing, notwithstanding the fact that the spool and the spindle of the spool mounting device will rotate in the counterclockwise direction as the tape is drawn from the spool by the capstan 22. Thus the tape transport operates to maintain a tension in the tape when it is stationary so that it can commence the transporting operation smoothly and rapidly immediately after a signal to transport in either direction since the force of the slipping clutch associated with whichever spool becomes the supply spool will be reduced to a minimum where it supplies just sufficient to maintain a slight tension in the tape as it is being transported.

When it is desired to stop the movement of the tape, an electrical signal is supplied to the capstan pinch roll 28 to withdraw it from engagement with the tape, and simultaneously with this signal, a signal is supplied to the spool mounting device 25 to revert the slipping clutch of that spool mounting device to supply its maximum frictional force. The tape transport is then in the initial condition in which the tension applied to the tape from each spool is equal, except for the inertia of the two reels. A short time after the signal to stop the transport, (say in the region of 10 milliseconds after that signal), a signal is supplied to the slipping clutch associated with the spool mounting device 26 to reduce to a minimum the frictional force supplied by that slipping clutch to assist in the braking of the tape to overcome the inertia of the reels. This signal may energise the solenoid of the slipping clutch of the spool mounting device 26 for a given time, sufficient time for the tape to stop after which the frictional force is returned to its maximum to balance the system as in the initial condition, or alternatively there may be provided a device sensitive to the rotation of the spools to reapply the slipping clutch of the spool mounting device 26 when the spools have stopped rotating.

The arrangement by which the tape is held under tension at all times assists in maintaining contact with the magnetic tape head or heads, and also ensures that any tendancy to overrun, that is over application of any force required to effect changes in the speed of the tape, is minimised.

We claim:

1. A bi-directional tape transport for a magnetic tape recording and/or playback machine, comprising a motor, two slipping clutches each having a driving member and a driven member, two tape spool mounting devices respectively connected to the driven members of the clutches, two capstans, a mechanical driving means interlinking and maintaining a constant phase relationship between the capstans, the clutch driving members and the motor, such that the capstans are rotated constantly in opposite directions and the clutch driving members are rotated constantly in opposite directions, and selection means adapted to co-operate with the capstans for selectively transmitting drive to the tape in either direction.

2. A tape transport as claimed in claim 1, comprising means for adjusting the frictional force exerted by the slipping clutches in dependence on which capstan is engaged to transmit drive to the tape.

3. A tape transport as claimed in claim 2, in which the means for adjusting the frictional force exerted by the slipping clutches is operative to reduce the frictional force exerted by the slipping clutch of the spool mounting device on which is mounted the spool from which tape is being drawn, and which is operative to raise the said frictional force to its maximum value substantially simultaneously with the disengagement of the driving capstan from the tape so that this slipping clutch acts as a brake.

4. A tape transport as claimed in claim 3, in which the means for adjusting the frictional force exerted by the slipping clutches is operative to reduce to a minimum the frictional force exerted by the slipping clutch of the spool mounting device on which the take-up spool is mounted, after the driving capstan has been disengaged from the tape, to assist in the braking operation of the other slipping clutch.

5. A tape transport as claimed in claim 2, in which the means for adjusting the frictional force exerted by the slipping clutches is operative to raise the frictional force exerted by both slipping clutches to a maximum when both capstans are disengaged from the tape.

6. A tape transport as claimed in claim 1, in which said selection means is a freely rotatable pinch roll associated with each capstan and which is movable selectively to effect engagement of the tape with the capstan and disengagement of the tape from the capstan.

7. A tape transport as claimed in claim 1, in which the mechanical driving means comprises a train of meshing gear wheels.

* * * * *